United States Patent
Svedberg

(10) Patent No.: US 8,246,267 B2
(45) Date of Patent: Aug. 21, 2012

(54) SAFETY POST

(75) Inventor: Joakim Svedberg, Frösön (SE)

(73) Assignee: Combisafe International AB, Ostersund (SE)

( * ) Notice: Subject to any disclaimer, the term of this patent is extended or adjusted under 35 U.S.C. 154(b) by 602 days.

(21) Appl. No.: 12/087,728

(22) PCT Filed: Jan. 24, 2007

(86) PCT No.: PCT/SE2007/000062
§ 371 (c)(1),
(2), (4) Date: Dec. 19, 2008

(87) PCT Pub. No.: WO2007/086795
PCT Pub. Date: Aug. 2, 2007

(65) Prior Publication Data
US 2009/0085022 A1    Apr. 2, 2009

(30) Foreign Application Priority Data

Jan. 24, 2006 (EP) .................................. 06100777

(51) Int. Cl.
*F16B 7/10* (2006.01)

(52) U.S. Cl. ............... 403/109.3; 403/109.1; 403/109.2; 403/109.8

(58) Field of Classification Search ............. 403/83, 403/109.1, 109.2, 109.3, 325, 109.8; 182/178.3, 182/204, 182.5; 292/262, 265–274, 289, 292/292; 135/139–142, 75
See application file for complete search history.

(56) References Cited

U.S. PATENT DOCUMENTS 5,400,870 A * 3/1995 Inoue ...................... 182/178.6
5,427,130 A * 6/1995 Yang ............................. 135/28
5,778,914 A * 7/1998 Trani ............................ 135/66

FOREIGN PATENT DOCUMENTS

| JP | 01152892 A | * | 6/1989 |
| JP | 6-286438 A | | 10/1994 |
| JP | 07292958 A | * | 11/1995 |
| JP | 09013661 A | * | 1/1997 |
| JP | 9-302922 A | | 11/1997 |
| JP | 09302922 A | * | 11/1997 |
| JP | 10-82171 A | | 3/1998 |
| JP | 10082171 A | * | 3/1998 |
| JP | 11-152892 A | | 6/1999 |
| JP | 11152892 A | * | 6/1999 |
| JP | 11315633 A | * | 11/1999 |
| JP | 2000328779 A | * | 11/2000 |

* cited by examiner

*Primary Examiner* — Michael P Ferguson
*Assistant Examiner* — Eric Chau
(74) *Attorney, Agent, or Firm* — Birch, Stewart, Kolasch & Birch, LLP

(57) ABSTRACT

A safety post mountable in a post holder includes an elongate tubular member and a locking device arranged inside of the tubular member. The locking device includes a lever and a bias spring device biasing the lever against an inner surface of the wall of the tubular member. The lever has a lock protrusion and a release protrusion extending through a first and second aperture portions of the wall, respectively. The lock protrusion is retractable to a release position inside of an outer surface of the tubular member by operation of the release protrusion in a counter biasing direction. The release protrusion has a support surface arranged to support the safety post against a support surface of the post holder, and the release protrusion is related to the lock protrusion such that, in the release position, the release protrusion is still protruding from said outer surface to an extent.

10 Claims, 4 Drawing Sheets

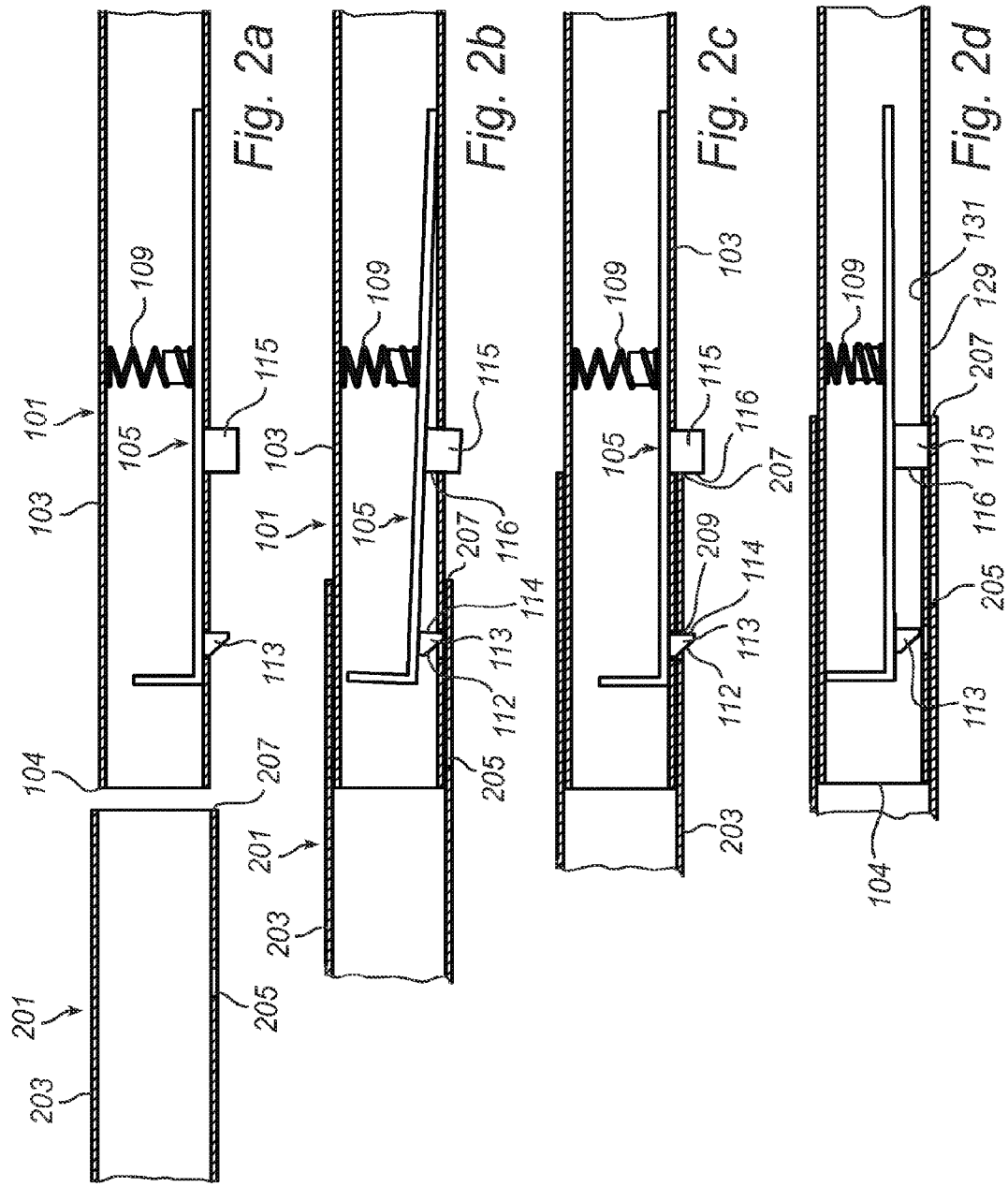

SAFETY POST

FIELD OF THE INVENTION

The present invention relates to a safety post comprising an elongate tubular member and a locking device mounted inside of the tubular member.

BACKGROUND OF THE INVENTION

Safety posts are used as parts of a safety system, such as a safety barrier for placement on the ground or on a staircase or at some other place, or as an edge protection on a building during construction or renovation preventing workers or tools from falling down. They can also be used as scaffolding posts. A safety post is mountable in a post holder, which can be for example a particular support that is attached to or resting on ground or some other base, or a general element, such as a scaffolding frame element. When mounting and demounting the safety post it is convenient that it is easy to fit the safety post into and remove the safety post from the post holder. Several different types of locking devices, which lock the post to the post holder, having a snap-in character, have been developed.

In Japanese patent application JP 11152892 a handrail locking device of a snap-in type is disclosed. The locking device is arranged at an end of a tube of the handrail, and it comprises a lever that is biased by means of a spring towards a locking position. The lever has a lock protrusion extending through a first hole of the tube wall, and a release protrusion extending in an opposite direction through a second hole of the wall. The lever acts like a seesaw, i.e. it pivots about a pivot portion located between the protrusions. The biasing spring is positioned between the lock protrusion and the pivot portion and extends from the lever to the inner surface of the tube wall in the same direction as the release protrusion, i.e. opposite to the extension direction of the lock protrusion. Thus, the bias spring continuously forces the lock protrusion out of the first hole and, at the same time, forces the release protrusion out of the second hole. When mounted in a handrail receptacle the lock protrusion extends through a hole in the wall of the receptacle, thereby locking the tube of the handrail in the receptacle, and preventing accidental lifting of the handrail out of the receptacle. The end surface of the tube is supported on a stop pin extending inwards of, or through, the receptacle. Thus, the stop pin defines the vertical position of the tube in the receptacle in order to align the lock protrusion with the hole of the receptacle wall and to support the handrail.

When the tube has been mounted in the receptacle, the lock protrusion is engaged with the receptacle and prevents the handrail from being pulled out of the receptacle. In order to remove the handrail from the receptacle, the release protrusion is simply pushed in. Thereby the lever pivots about the pivot portion and the lock protrusion is retracted to a position where it resides in the hole of the wall of the tube and no longer protrudes from the outer surface of the wall. Thereby the lock protrusion is no longer engaged with the receptacle, and the handrail can be removed.

This prior art locking device is working with a good principle of a biased pivotable lever. However, it is disadvantageously dependent on the existence of the stop pin at the receptacle for supporting the tube and correctly aligning the locking device.

In Japanese patent application JP 09302922 a locking device is arranged at an end of first tube, and it comprises a lock element that is biased by means of a spring towards a locking position. The lock element has a lock protrusion extending through a first hole of the tube wall, and a release protrusion extending in the same direction through a second hole of the wall. The first tube is joinable with a second tube having a slightly larger diameter and having a lock hole in its wall. When joined the lock protrusion extends through the lock hole, and the end of the second tube abuts against the release protrusion. To demount the tubes, the release protrusion is simply pushed in. Thereby the lock protrusion is retracted to a position within the first tube. Thereby the lock protrusion is no longer engaged with the second tube, which can be removed. If there is a joining force, such as a force of gravity, when the lock protrusion is released the second tube moves a bit further onto the first tube, though only into a stop recession of the release protrusion.

A disadvantage of this prior art locking device is that there is no possibility of pushing the first tube further into the second tube in a simple way, which would be of interest in many situations.

SUMMARY OF THE INVENTION

It is an object of the present invention to provide a safety post that alleviates the above-mentioned drawbacks of the prior art.

This object is achieved by a safety post as defined in claim 1.

Thus, in accordance with an aspect of the present invention, there is provided a safety post comprising an elongate tubular member and a locking device arranged inside of the tubular member at a first end thereof. The first end is arranged to be received in a post holder. By "post holder" is meant any kind of device that is adapted to receive the first end of the safety post. For example, it can be a particularly formed support device or just an end of another tubular element. The locking device includes a lever and a bias spring device biasing the lever against an inner surface of the wall of the tubular member. The lever has a lock protrusion extending through a first aperture portion of said wall, and protruding from an outer surface of said wall, and a release protrusion extending through a second aperture portion of said wall, and protruding from said outer surface. The release protrusion is arranged at a distance from said lock protrusion, and farther from said first end than the lock protrusion. The lock protrusion is retractable to a release position inside of said outer surface of the tubular member by operation of the release protrusion in a counter biasing direction, in a first operation step, requiring a first operation force exerted on said release protrusion. The release protrusion has a support surface, which is arranged to support the safety post against a support surface of said post holder. The release protrusion is related to said lock protrusion such that, in the release position, the release protrusion is still protruding from said outer surface. A non-protruding position of the release protrusion is obtained by a further operation of the release protrusion in the counter biasing direction, in a second operation step requiring a second operation force, which is distinctly higher than the first operation force.

By providing the support surface of the release protrusion, the safety post becomes independent of any particular arrangement on the post holder for supporting the safety post. For example, the support surface of the post holder simply can be the end surface thereof. However, of course, if desired the post holder can be provided with some particular surface portion serving as the support surface. Further, since the release protrusion, after having pushed it in for releasing the lock protrusion, still protrudes from the outer surface of the tubular member the safety post will still be supported thereby.

This eliminates or at least reduces a risk for the safety post to move further into the post holder, which might otherwise have been possible. However, as will be further explained below, this does not exclude an embodiment where it is possible to push the release protrusion further into the tubular member in order to deliberately achieve a movement of the safety post further into the post holder.

It should be noted that the first and second apertures can be, for example, separate holes adapted to the sizes of the respective protrusions, or an elongate common slit. Further the term "tubular" comprises circular as well as polygonal cross-sections.

Furthermore, the release protrusion is operable in a two-step operation. The release position is reached in a first operation step requiring a first operation force exerted on the release protrusion, whereupon said release protrusion is still protruding from said outer surface to an extent. The release protrusion is operated further on to a non-protruding position in a second operation step requiring a second, distinctly higher operation force.

Thus, if desired, it is possible to operate the release protrusion such that it becomes fully hidden within the outer surface of the wall of the tubular member. Due to the distinctly higher force needed for the second operation, the risk that the release protrusion is inadvertently pushed all way in is substantially reduced. Thus, it is possible to obtain a two-position mounting of the safety post in the post holder. In particular, this is useful for edge protection applications, where the safety posts are typically used in a temporary safety barrier system for carrying mesh panels. Then, it is often advantageous to be able to change the height of the posts in different stages of raising a building. This embodiment provides a simple means for changing the height of the safety post in such an application.

In accordance with an embodiment of the safety post, it is the arrangement of the lever that provides for the two-step operation.

In accordance with an embodiment of the safety post, the lever is suspended such that, during said first step, the first operation force and a counter acting force generated by the bias spring device, are acting on torque arms having a first length ratio, and that, during said second operation step, the second operation force and a counter acting force generated by the bias spring device are acting on torque arms having a second length ratio, which is smaller than said first length ratio. In other words, the locking device is constructed such that at least one of the torque arms is different during the second operation step than during the first operation step.

In accordance with an embodiment of the safety post, the lever has a first pivot portion, about which the lever is arranged to pivot during said first operation step, and a second pivot portion, about which the lever is arranged to pivot during said second operation step. Thereby, the two-step function is advantageously obtained.

In accordance with an embodiment of the safety post, the first and second pivot portions are formed at different sides of said release protrusion, for example at the opposite ends of the lever. In this embodiment, inter alia, it is easy to obtain the different torque arm length ratios mentioned above.

In accordance with an embodiment of the safety post, the lever has an elongate major portion, which extends substantially longitudinal of the tubular member, and with which said protrusions are connected, and an elongate end portion, which is connected with said major portion at an angle thereto, and which comprises said second pivot portion. For example, this embodiment can be implemented in a simple way such that the lever is first pivoting about the first portion until the very end of the end portion reaches the inner surface of the wall of the tubular member, whereupon the further pivoting takes place about the very end of the end portion.

In accordance with embodiments of the safety post, the two-step operation of the release protrusion is obtained by means of the spring device alone or in combination with the above-mentioned embodiments. For example, the spring constant of the spring device is larger during the second step than during the first step, or the spring device comprises at least two different spring elements, at least one of which is continuously actuated, and at least one of which is actuated merely during the second step, thereby increasing the counter force generated by the spring device during the second step.

These and other aspects, features, and advantages of the invention will be apparent from and elucidated with reference to the embodiments described hereinafter.

BRIEF DESCRIPTION OF THE DRAWINGS

The invention will now be described in more detail and with reference to the appended drawings in which:

FIGS. 2a-d schematically, in longitudinally sectional views, show the embodiment of FIGS. 1a-d together with a post holder;

DESCRIPTION OF PREFERRED EMBODIMENTS

Figure 1A:
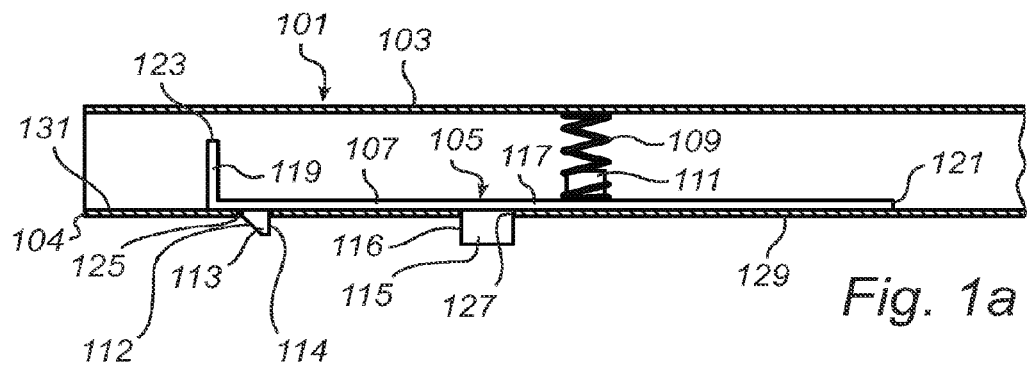
FIGS. 1a-d schematically, in longitudinally sectional views, show a portion of an embodiment of a safety post according to this invention.

A first embodiment of the safety post 101 according to the present invention comprises a tubular member 103, and a locking device 105, which is mounted in the tubular member 103 at one end 104 thereof. Since the figures show only a portion of the safety post the other end of the safety post 101 is not shown. The locking device comprises a lever 107, and a bias spring device 109. In this embodiment the bias spring device consists of a single spring 109, one end of which is mounted on a spring seat, in the form of a protrusion, 111 of the lever 107. The spring 109 extends diametrically of the tubular member 103. The length of the spring 109 is chosen such that it is always at least slightly compressed, thereby biasing the lever 107 against an inner surface 131 of the tubular member 103. The lever 107 comprises an elongate major portion 117, which extends longitudinally of the tubular member 103 and an elongate end portion 119, which is connected with the major portion 117 at an end thereof and which extends perpendicular to the major portion 117, i.e. diametrically of the tubular member 103. The major portion 117 comprises a lock protrusion 113, close to the end portion 119, and a release protrusion 115, which is located at a distance from the lock protrusion 113 towards one end 121 of the lever 107, which is also a free end of the major portion 117. The other end 123 of the lever 107 is a free end of the end portion 119.

In a basic position, which is also a locking position, of the locking device, as shown in FIG. 1a, the lock protrusion 113 extends through a first aperture, which is a through hole, 125 of the tubular member 103, and more particularly of the wall 103 of the tubular member 103. Further, the lock protrusion 113 protrudes from the outer surface 129 in order to be able to engage with a post holder, as will be further explained below. The lock protrusion 113 has an oblique snap-in surface 112 towards the end 104 of the tubular member 103, and an engagement surface 114, facing the other way, i.e. facing the release protrusion 115. The engagement surface 114, in this locking position, extends radially of the tubular member 103.

The release protrusion 115 extends through a second aperture 127 of the wall 103, and protrudes from the outer surface 129 of the tubular member 103, in order to engage with the post holder, and to be able to serve as a support for the safety post 101 when mounted in a post holder, as will be further explained below. Therefore the release protrusion 115 has a support surface 116 facing the engagement surface 114 of the lock protrusion 113, and extending in parallel thereto.

Figure 1B:
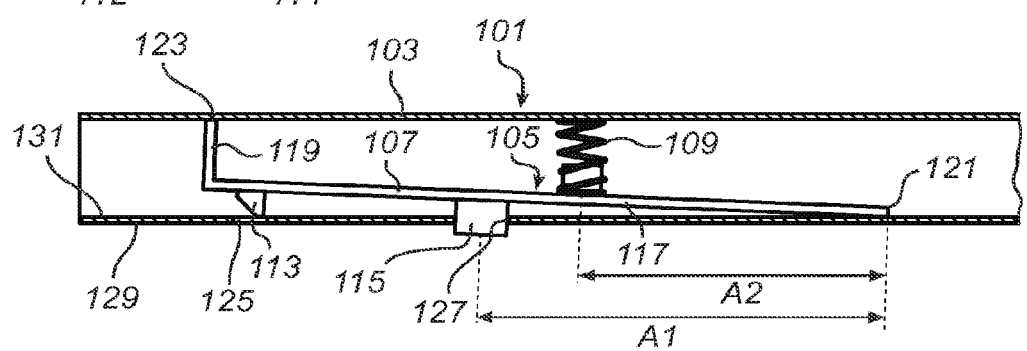

In FIG. 1*b* a release position is shown, where the release protrusion 115 has been operated, here pushed in, in a first operation step, to a position where it still protrudes from the outer surface 129, though to a smaller extent than in the locking position. Since the biasing spring 109 is positioned between the release protrusion 115 and said one end 121 of the lever 107, when pushing the release protrusion 115 the lever 107 will pivot about said one end 121, which constitutes a first pivot portion. Consequently, the other end 123 of the lever 107 will move towards the inner surface 131 opposite to the first aperture 125 until it reaches that surface 131. This causes the lock protrusion 113 to be retracted into the tubular member 103.

Figure 1C:
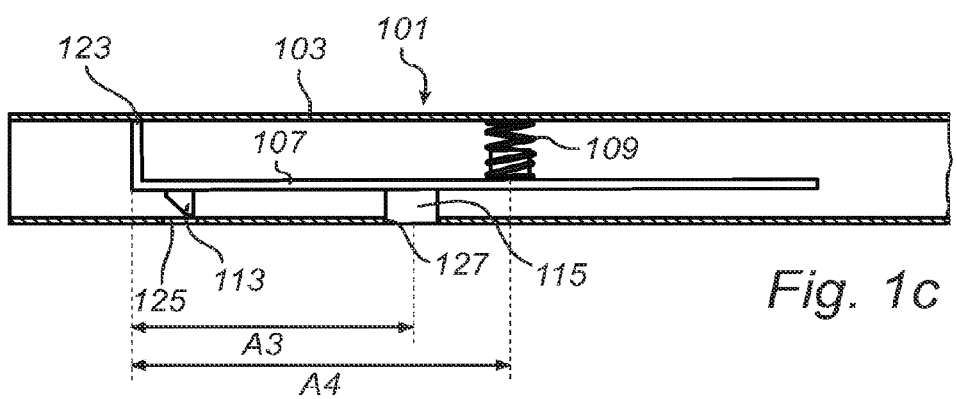

In FIG. 1*c* a post adjustment position is shown. Here the release protrusion has been further operated in a second operation step, to a non-protruding position, i.e. a position where it no longer protrudes from the outer surface 129 of the tubular member 103, but ends approximately in the plane of the outer surface. During this second operation step the lever 107 pivots about said other end 123 of the lever, i.e. the free end of the perpendicular end portion 119 of the lever 107, which abuts on the inner surface 131. Thus, said other end 123 of the lever constitutes a second pivot portion.

The forces that are required to push in the release protrusion 115 during said first and second operation steps, respectively, differ. This is due to different length ratios between the torque arms. As shown in FIG. 1*b*, in the first operation step, the operation force exerted on the release protrusion 115 acts upon a first torque arm A1 that is longer than the second torque arm A2, upon which the counter acting force generated by the spring 109. The first and second torque arms extend from the respective centres of the release protrusion 115 and the spring 109 and the first pivot portion 121. This results in a first length ratio of A1/A2>1. On the other hand, in the second operation step, as seen in FIG. 1*c*, the operation force exerted on the release protrusion 115 now acts on a third torque arm A3 that is shorter than a fourth torque arm A4 used by the spring 109. The third and fourth torque arms respectively extend from the centres of the release protrusion 115 and the spring 109 to the second pivot portion 123. Thus, a second length ratio becomes A3/A4<1. The second length ratio is smaller than the first length ratio, and, consequently, the operation force needed for the second step is higher than that needed for the first step.

Figure 1D:
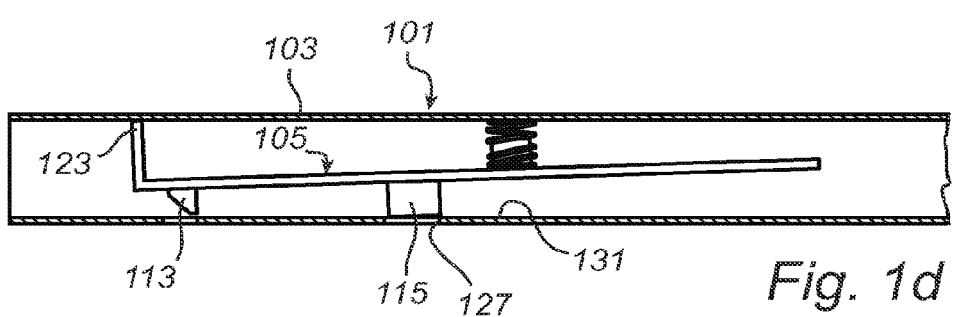

FIG. 1*d* shows a mounting/demounting position where the locking device 105 is movable along the tubular member 103. This is used for inserting the locking device into the tubular member 103, and, where appropriate, for removing the locking device from the tubular member 103. In this mounting/demounting position both protrusions 113, 115 are fully within the tubular member 103, i.e. inside of the inner surface 131.

FIGS. 2*a*-2*d* shows mounting/demounting of the safety post 101 in a post holder 201, and adjusting the position of the safety post 101 relative to the post holder 201.

The post holder 201 has a tubular holder member 203, which has an inner diameter that is slightly larger than the outer diameter of the tubular member 103 of the safety post 101. Further, the post holder 201 has an engagement aperture 205, which is a through hole of the wall of the tubular holder member 203. The distance from an open end 207 of the tubular holder member 203 to an engagement surface, which is an edge portion of the hole 205 located closet to the open end 207, is only slightly shorter than the distance from the engagement surface 114 of the lock protrusion 113 to the support surface 116 of the release protrusion 115.

When moving the safety post 101 towards and into the post holder 201, the snap-in surface 112 of the lock protrusion 113 will strike the end surface of the open end 207. Due to the obliqueness thereof the snap-in surface will slide against that end surface. Thereby, the lock protrusion will be forced into the tubular member 103, against the biasing force of the spring 109, as shown in FIG. 2*b*. The safety post 101 will move further into the post holder 201 until the support surface 116 of the release protrusion 115 meets the end surface of the open end 207. Simultaneously, the lock protrusion 113 will be aligned with the engagement aperture 205 of the tubular holder member 203, and will thus be pushed through the engagement aperture 205 by the biasing force. Consequently, the locking position shown in FIG. 2*c* has been entered. In this position the support surface 116 of the release protrusion 115 abuts on the end surface of the end of the tubular holder member 203. Typically, the safety post is used in an upright position, where the weight of the safety post and any fence or mesh panel or the like carried by the post will be carried by the release protrusion 115. Thus, the snap-in surface facilitates the mounting and makes it automatic, i.e. the user does not have to push the release protrusion in order to enter the safety post 101 into the post holder 201.

In the locking position, the locking device 105 thus locks the safety post 101 to the post holder 201, preventing undesired removal of the safety post 101 from the post holder 201. If one does wish to demount the safety post 101 from the post holder 201, the release protrusion 115 is simply pushed in until the release position, see FIG. 2*b*, is reached. The person operating the release protrusion 115 will not inadvertently push the release protrusion 115 further into the tubular member 103, since she/he will perceive a distinct increase in the resistance when reaching the release position. Then the safety post 101 can be removed.

If one wishes to lower the safety post, i.e. move it further into the post holder 201, the release protrusion 115 is pushed further into the tubular member 103 until the post adjustment position is reached. Then the safety post 101 can be further lowered/moved into the post holder 201, see FIG. 2*d*, wherein the release protrusion 115 passes the end 207 of the post holder 201 and moves into the tubular holder member 203.

Figure 3A:
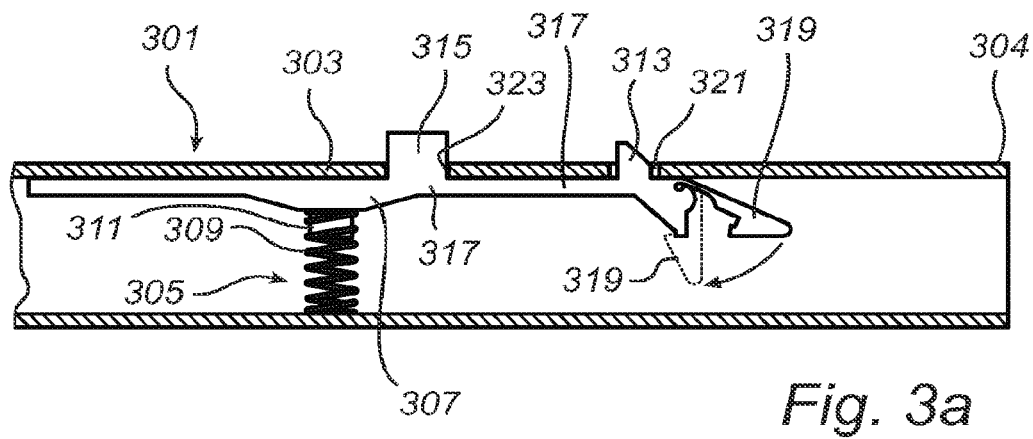
FIGS. 3a-3b schematically, in longitudinally sectional views, show another embodiment of the safety post according to this invention.
Figure 3B:
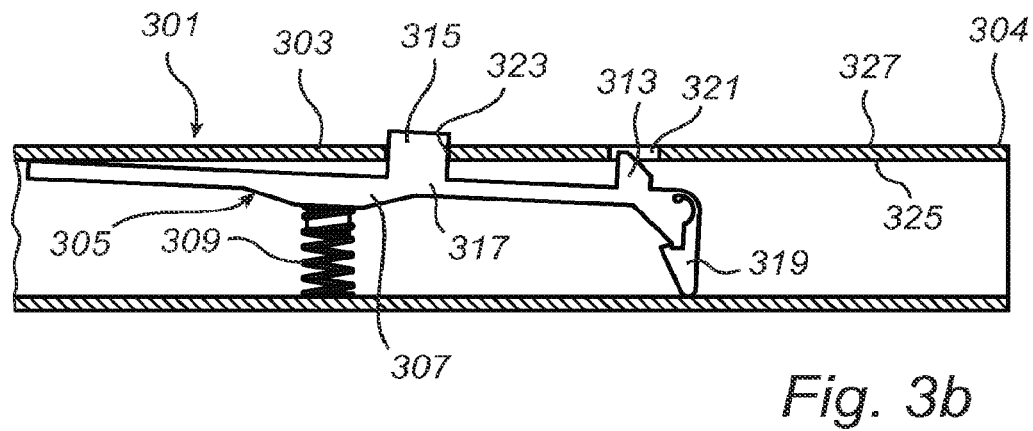

An alternative embodiment of the safety post, and more particularly of the locking device, is shown in FIGS. 3*a* and 3*b*. Similar to the other embodiment, safety post 301 has a tubular member 303 and a locking device 305. The locking device 305 comprises a lever 307, and a spring device 309 connected to the lever 307 at a spring seat 311 thereof. The lever comprises a lock protrusion 313 extending through a hole 321 in the wall of the tubular member 303, and a release protrusion 315 extending through another hole 323 of the wall. The lever has an elongate major portion 317 and an end portion 319. The major difference from the other embodiment is the end portion 319, which before mounting of the locking device 305 into the tubular member 303 is in a first position, where it is approximately aligned with or extends at an angle to the major portion 317. After insertion of the locking device 305 into the tubular member 303, the end portion 319 is (further) bent in relation to the major portion 317 into a second position, which is shown by dashed lines in FIG. 3a. When the end portion 319 is being bent into the second position the lock protrusion 313 must be aligned with the hole 321 of the wall of the tubular member 303. In practise this means that the locking device is in the locking position, where each protrusion 313, 315 extends through its respective hole 321, 323, and protrudes from the outer surface 327 of the tubular member 303. Once bent into the second position, the end portion 319 extends approximately diametrically through the inner space of the tubular member 303. Then the end portion 319 is long enough to prevent the locking device from being removed from the tubular member 303. This is evident from FIG. 3b, where the locking device is in the release position, and yet the lock protrusion 313 is not retracted inside of the inner surface 325 of the wall of the tubular member 303. Even if the release protrusion 315 would be pushed to a position inside of the inner surface 325 the lock protrusion 313 would remain extending into the hole 321 to an extent.

Figure 4A:
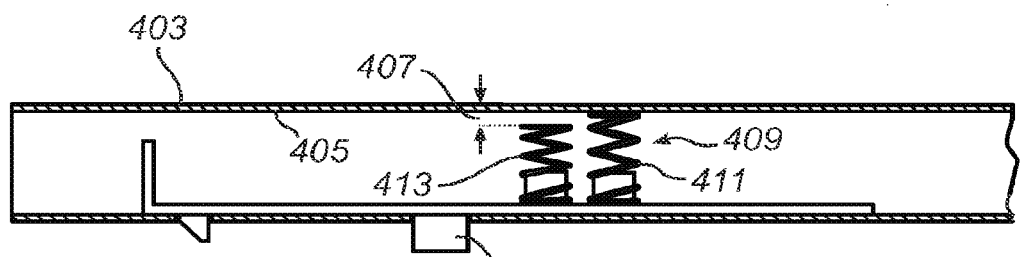
FIGS. 4a-c schematically, in longitudinally sectional views, show yet another embodiment of the safety post according to this invention.
Figure 4B:
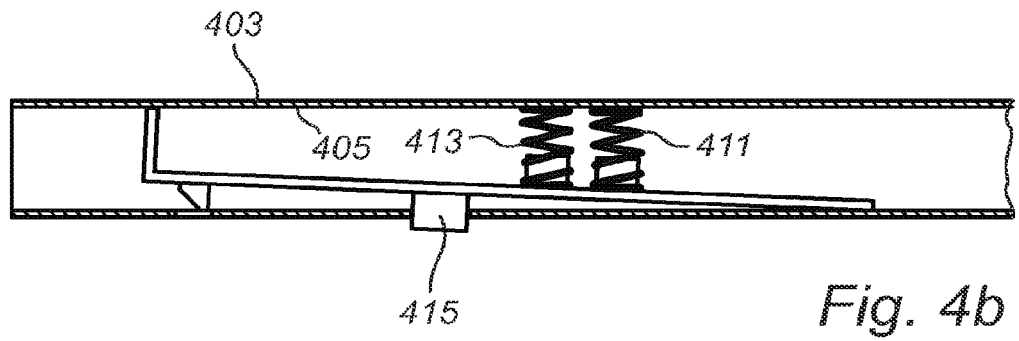
Figure 4C:
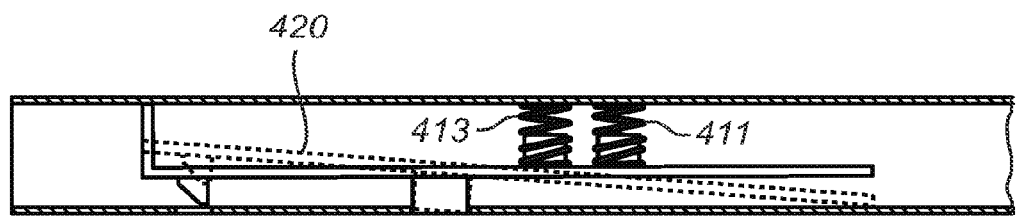

Further embodiments are shown in FIGS. 4a-4c, and FIG. 5. A more complex spring device can be used instead of or in conjunction with the previously described embodiments of the locking device. As shown in FIGS. 4a-4c the spring device 409 comprises two springs, while the rest of the safety post is similar to the first embodiment above. A basic spring 411 of the spring device 409 corresponds to the spring described in the embodiments above, and an auxiliary spring 413 is added. In the locking position of FIG. 4a the auxiliary spring 413 does not reach the inner surface 405 of the tubular member 403, but there is a gap 407 between the end of the spring and the inner surface 405. In the release position of FIG. 4b the auxiliary spring 413 has made contact with the inner surface 405. Thus, for a second operation step of the release protrusion 415 moving it into an adjustment position, as shown in FIG. 4c, the counter force of the auxiliary spring is added to that of the basic spring 411, requiring an increased operation force during the second operation step compared to what was needed in the embodiments described above.

However, as an alternative, a lever 420 lacking of the angled end portion can be used, as shown by dashed lines in FIG. 4c. Then, since there is no second pivot portion, there is no change of torque arms from the first to the second operation step. Then the auxiliary spring 413 alone provides for the two-step function. Thus, the first operation step will correspond to what has been described above, while the second operation step is defined by the auxiliary counter force generated by the auxiliary spring 413 from the moment when it reaches the inner surface 405 of the tubular member 403.

Figure 5:
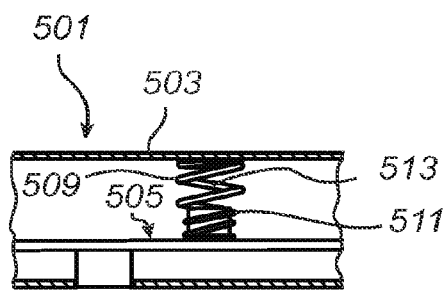
FIG. 5 schematically, in a longitudinally sectional view, shows a further embodiment of the safety post according to this invention.

In FIG. 5 an alternative spring device 509 is shown. It has a single spring but the spring consists of a primary spring section 511 and a secondary spring section, which has a larger spring constant than the first spring section 511. The spring sections 511, 513 are connected in series. During the first operation step only the primary spring section is actuated providing a first spring force. The primary spring section becomes fully compressed during the first operation step. Consequently, during the second operation step the secondary spring section is actuated providing an increased spring force. This spring device can be used as a substitute for any one of the spring devices described above.

Above, embodiments of the safety post according to the present invention have been described. These should be seen as merely non-limiting examples. As understood by a skilled person, many modifications and alternative embodiments are possible within the scope of the invention.

It is to be noted, that for the purposes of this application, and in particular with regard to the appended claims, the word "comprising" does not exclude other elements or steps, that the word "a" or "an", does not exclude a plurality, which per se will be apparent to a person skilled in the art.

The invention claimed is:

1. A safety post comprising an elongate tubular member and a locking device arranged inside of the tubular member at a first end thereof, which is arranged to be received in a post holder, wherein said locking device includes a lever and a bias spring device biasing the lever against a first inner surface of the wall of the tubular member, wherein the lever has a lock protrusion extending through a first aperture portion of said wall, and protruding from an outer surface of said wall, and a release protrusion extending through a second aperture portion of said wall, and protruding from said outer surface, wherein said release protrusion is arranged at a distance from said lock protrusion, and farther from said first end than the lock protrusion, wherein the lock protrusion is retractable to a release position inside of said outer surface of the tubular member by operation of the release protrusion in a counter biasing direction, in a first operation step requiring a first operation force exerted on said release protrusion, wherein said release protrusion has a support surface, which is arranged to support the safety post against said post holder, and wherein said release protrusion is related to said lock protrusion such that in the release position the release protrusion is still protruding from said outer surface, and wherein a non-protruding position of the release protrusion is obtained by a further operation of the release protrusion in the counter biasing direction, in a second operation step requiring a second operation force, which is distinctly higher than the first operation force, wherein said lever has an elongate major portion, extending substantially longitudinal of the tubular member, and comprising a first end of the lever, and a second end of the lever is an elongate end portion, connected with said major portion at an angle greater than 0° and less than 180° wherein in the first operation step the release protrusion is depressed such that the first end engages and pivots about the first inner surface of the wall such that the second end approaches and engages an opposite inner surface of the wall, and in the second operation step the second end engages and pivots about the opposite inner surface of the wall such that the first end approaches the opposite inner surface of the wall.

2. A safety post according to claim 1, wherein the said elongate end portion is connected at an angle of 90° relative to said elongate major portion.

3. A safety post according to claim 1, wherein the spring constant of said bias spring device is larger during said second operation step than during said first operation step.

4. A safety post according to claim 3, wherein said bias spring device comprises a primary spring element, which provides said biasing, and an secondary spring element, which is in operation in common with said primary spring element during said second operation step.

5. A safety post according to claim 3, wherein said bias spring device comprises at least one spring, which has a primary spring section and a secondary spring section, which is connected in series with said first spring section, and which has a larger spring constant than the primary spring section.

6. A safety post according to claim 1, wherein said lock protrusion has an oblique snap-in surface.

7. A safety post according to claim 1, wherein the second end of the lever extends in a radial direction perpendicular to a longitudinal axis of the tubular member.

8. A safety post according to claim 1, wherein said lever is suspended such that, during said first operation step, said first operation force forms a first lever arm between the release protrusion and the first end of the lever, and a counter acting force generated by said bias spring device forms a second lever arm between the bias spring device and the first end of the lever; during said second operation step, the second operation force forms a third lever arm between the release protrusion and the second end of the lever, and a counter acting force generated by said bias spring device forms a fourth lever arm between the bias spring device and the second end of the lever; and a ratio of the first lever arm to the second lever arm is bigger than a ratio of the third arm to the fourth arm.

9. A safety post according to claim 1, wherein the bias spring device is positioned between the release protrusion and the first end of the lever.

10. A safety post according to claim 7, wherein an axial dimension of the tubular member in the radial direction is substantially equal to a sum of axial dimensions of the second end and the lock protrusion in the radial direction.

* * * * *